US012225935B2

(12) United States Patent
Emmett et al.

(10) Patent No.: US 12,225,935 B2
(45) Date of Patent: Feb. 18, 2025

(54) AEROSOL-GENERATING DEVICES

(71) Applicant: PHILIP MORRIS PRODUCTS S.A., Neuchâtel (CH)

(72) Inventors: Robert Emmett, Neuchâtel (CH); Dionisius Florack, Le Landeron (CH)

(73) Assignee: PHILIP MORRIS PRODUCTS S.A., Neuchâtel (CH)

( * ) Notice: Subject to any disclaimer, the term of this patent is extended or adjusted under 35 U.S.C. 154(b) by 353 days.

(21) Appl. No.: 17/765,720

(22) PCT Filed: Oct. 1, 2020

(86) PCT No.: PCT/IB2020/059227
§ 371 (c)(1),
(2) Date: Mar. 31, 2022

(87) PCT Pub. No.: WO2021/064644
PCT Pub. Date: Apr. 8, 2021

(65) Prior Publication Data

US 2022/0400752 A1 Dec. 22, 2022

(30) Foreign Application Priority Data

Oct. 4, 2019 (EP) .................................... 19201572

(51) Int. Cl.
*A24F 40/40* (2020.01)
*A24D 1/20* (2020.01)
(Continued)

(52) U.S. Cl.
CPC ................ *A24F 40/40* (2020.01); *A24D 1/20* (2020.01); *A24F 40/20* (2020.01); *A24F 40/50* (2020.01); *B26D 1/157* (2013.01); *B26D 7/0608* (2013.01)

(58) Field of Classification Search
CPC .......... A24F 40/40; A24F 40/20; A24F 40/50; A24D 1/20; B26D 1/157; B26D 7/0608
(Continued)

(56) References Cited

U.S. PATENT DOCUMENTS 10,080,851 B2 9/2018 Davidson et al.
10,321,713 B2 6/2019 Hopps et al.
(Continued)

FOREIGN PATENT DOCUMENTS

EP 2451514 5/2012
WO 19950001137 1/1995

OTHER PUBLICATIONS

International Search Report and Written Opinion for PCT/IB2020/059227 issued by the European Patent Office, Dec. 7, 2020; 11 pgs.
(Continued)

*Primary Examiner* — Gary F Paumen
(74) *Attorney, Agent, or Firm* — Mueting Raasch Group

(57) ABSTRACT

An aerosol-generating device (1) includes a heating element (8); a dosing assembly (2) comprising: a cutting mechanism (4) disposed in a cutting region and configured to cut a portion from an aerosol-generating article (20) received by the aerosol-generating device; and a transfer mechanism (6) configured to transfer a cut portion of the aerosol-generating article from the cutting region to the heating element. The cutting mechanism may include a first blade (41) with a first cutting direction and a second blade (42) with a second cutting direction different from the first cutting direction.

15 Claims, 6 Drawing Sheets

(51) Int. Cl.

| | |
|---|---|
| ***A24F 40/20*** | (2020.01) |
| ***A24F 40/50*** | (2020.01) |
| ***B26D 1/157*** | (2006.01) |
| ***B26D 7/06*** | (2006.01) |

(58) Field of Classification Search
USPC .......................................................... 131/328
See application file for complete search history.

(56) References Cited

U.S. PATENT DOCUMENTS

| | | | | |
|---|---|---|---|---|
| 10,588,349 | B2 | 3/2020 | Borkovec et al. | |
| 10,765,821 | B2 * | 9/2020 | Raichman | A24D 1/20 |
| 2018/0154103 | A1 | 6/2018 | Davis | |
| 2019/0208823 | A1 | 7/2019 | Raichman | |

OTHER PUBLICATIONS

European Search Report for EP 19201572.5 issued by the European Patent Office on Mar. 30, 2020; 8 pgs.
International Preliminary Report on Patentability for PCT/IB2020/059227, issued Apr. 14, 2022; 8 pages.

* cited by examiner

AEROSOL-GENERATING DEVICES

This application is the § 371 U.S. National Stage of International Application No. PCT/IB2020/059227, filed Oct. 1, 2020, which claims the benefit of European Application No. 19201572.5, filed Oct. 4, 2019, which are incorporated herein by reference in their entireties.

This disclosure relates to an aerosol-generating device that may be used to dose an aerosol-forming substrate. In particular, this disclosure relates to a dosing assembly in such an aerosol-generating device that may be used to dose an aerosol-forming substrate. This disclosure relates to methods of using the aerosol-generating device. In particular, this disclosure relates to methods of dosing an aerosol-forming substrate.

Preferably, such devices and methods are configured to dose or meter a portion of an aerosol-generating article comprising an aerosol-forming substrate, and to heat the portion of the aerosol-generating article to cause generation of an aerosol, without combusting the aerosol-generating article. These are known as "heat-not-burn" devices and are often used for consumption of tobacco or tobacco-based products. For instance, these devices may heat tobacco-based aerosol-generating articles in order to release aerosols which contain nicotine and aromatic substances.

One illustrative internal heating, heat-not-burn, device heats tobacco-containing articles that resemble conventional cigarettes. Such heating device includes a heating blade that pierces the tobacco-containing article to contact and heat the tobacco substrate. A user may draw on a mouth end of the device to cause aerosol flow through the tobacco-containing article for inhalation. Because the substrate is not combusted, by-products of combustion and pyrolysis are not included in the aerosol, and thus are not delivered to the user for inhalation.

Nicotine compositions for use with aerosol-generating articles are known. Often the nicotine composition is a liquid composition, such as an e-liquid, that is heated by a coiled electrically resistive filament of an aerosol generating article. To avoid accidental leakage of the liquid composition, care is taken to manufacture the containers holding this liquid composition. Accidental leakage may, in particular, occur when the container is made of paper, cardboard or any material that could absorb or could be damaged by a liquid nicotine composition.

Usual electronic smoking devices are typically not designed to measure or adjust the amount of aerosol delivered during consumption of the consumable.

It would be desirable to conveniently dose or meter an aerosol-forming substrate per puff or per experience in an aerosol-generating device (for example, electronic smoking device). It would be desirable to provide an aerosol-generating device that is capable of dosing or metering an aerosol-forming substrate. It would be desirable to provide a method for dosing or metering an aerosol-forming substrate in an aerosol-generating device. It would be desirable to provide an aerosol-generating article comprising an aerosol-forming substrate for an aerosol-generating device that can be conveniently dosed or metered.

The present disclosure relates to aerosol-generating devices that may be used to generate an aerosol from an aerosol-generating article. The devices may comprise a dosing assembly. The dosing assembly may be capable of dosing or metering a portion of the aerosol-generating article. The dosing assembly may comprise a cutting mechanism. The cutting mechanism may be disposed in a cutting region of the aerosol-generating device. The cutting mechanism may be configured to cut a portion from an aerosol-generating article received by the aerosol-generating device. The dosing assembly may comprise a transfer mechanism. The transfer mechanism may be capable of transferring the cut portion to a heating region of the aerosol-generating device. The transfer mechanism may be capable of transferring the cut portion to a heating element. The heating element may be part of the aerosol-generating device. The heating element may be capable of heating the cut portion of the aerosol-generating article. This may generate an aerosol. The aerosol-generating article may comprise an aerosol-forming substrate. The aerosol-forming substrate may comprise nicotine. The cutting mechanism may comprise at least one blade. The cutting mechanism may comprise only a first blade. The cutting mechanism may comprise a first blade and a second blade. The cutting mechanism may comprise a blade grid. The cutting mechanism may comprise a punch cutter.

According to another embodiment of the present disclosure, an aerosol-generating device comprises a heating element and a dosing assembly. The dosing assembly comprises a cutting mechanism disposed in a cutting region and configured to cut a portion from an aerosol-generating article received by the aerosol-generating device. The dosing assembly comprises a transfer mechanism configured to transfer the cut portion of the aerosol-generating article from the cutting region to the heating element. The cutting mechanism may comprise at least one blade. The cutting mechanism may comprise only a first blade. The cutting mechanism may comprise a first blade and a second blade. The cutting mechanism may comprise a blade grid. The cutting mechanism may comprise a punch cutter.

The cutting mechanism may comprise a blade. The cutting mechanism may comprise a first blade with a first cutting direction. The cutting mechanism may comprise a second blade with a second cutting direction. The second cutting direction may be different from the first cutting direction. The second cutting direction may be perpendicular to the first cutting direction. The first blade may be movable in the first cutting direction. The second blade may be movable in the second cutting direction. The cutting mechanism may comprise a blade grid. The blade grid may be constructed to simultaneously cut the consumable into multiple portions. The cutting mechanism may comprise a punch cutter. The cutting mechanism may comprise any of: a first blade, a second blade, a blade grid and a punch cutter. The cutting mechanism may comprise any combination of two or more of a first blade, a second blade, a blade grid and a punch cutter.

The transfer mechanism may comprise a pushing member. The pushing member may be linearly translatable in a first direction. The pushing member may be linearly translatable in a second direction. The pushing member may be linearly translatable in a third direction.

The dosing assembly may comprise a controller comprising one or more processors. The controller may be configured to determine which one or more portions of the aerosol-generating article have not been cut. The controller may be configured to determine which one or more portions of the aerosol-generating article have been cut. The controller may be configured to determine which one or more portions of the aerosol-generating article are available for cutting. The controller may be configured to determine both which one or more portions of the aerosol-generating article have not been cut and which one or more portions of the aerosol-generating article have been cut, and which one or more portions of the aerosol-generating article are available for cutting.

The controller may be configured to receive an input indicative of a desired aerosolization profile. The term "aerosolization profile" is used here to indicate a profile of generation (for example, rate of generation) or program for the generation of the aerosol. The profile or program may refer to one or more operational parameters over time. For example, the profile may refer to a temperature over time or a power supplied to a heating element over time. In some instances the profile or program may be a heating profile or program (for example, a program defining the temperature and rate of heating). The profile or program may involve a chemical reaction. The profile or program may refer to a mechanical stimuli, such as ultrasound. The controller may be configured to receive an input indicative of a desired aerosol profile. The term "aerosol profile" is used here to refer to one or more properties of the composition of the aerosol or to a collection of properties of the composition of the aerosol. For example, the aerosol profile may indicate an amount of active ingredient, strength of active ingredient, the flavor of the aerosol, or a combination thereof. The input may be an input form a user. For example, the controller may be configured to receive an input from a user, the input defining a desired aerosolization profile or aerosol profile or both. The input may be an input indirectly indicative of an aerosolization profile. For example, the input may be indicative of a type of aerosol-generating article to be used with or received by the aerosol-generating device. The input may be indicative of a type of aerosol-forming substrate of an aerosol-generating article to be used with or received by the aerosol-generating device. The input may be an input from a sensing means, such as one or more sensors. The one or more sensors may be part of the aerosol-generating device. The one or more sensors may be part of an auxiliary device. For example, the controller may be configured to receive an input from one or more sensing means, such as one or more sensors, of the aerosol-generating device. The one or more sensing means may provide a signal to the controller indicative of a type of aerosol-generating article to be used with or received by the aerosol-generating device. The one or more sensing means may provide a signal to the controller indicative of a type of aerosol-forming substrate of an aerosol-generating article to be used with or received by the aerosol-generating device. The controller may be configured to determine based on the received input, how much of the aerosol-generating article to cut or which portion of the aerosol-generating article to cut.

A method of dosing an aerosol-generating article using the aerosol-generating device may comprise placing the aerosol-generating article in the cutting region; actuating the cutting assembly to cut a portion of the aerosol-generating article; actuating the transfer mechanism to transfer the cut portion into a heating region of the aerosol-generating device; and heating the cut portion of the aerosol-generating article with the heating element.

The method may comprise determining which one or more portions of the aerosol-generating article have not been cut. The method may comprise determining which one or more portions of the aerosol-generating article have been cut. The method may comprise determining which one or more portions of the aerosol-generating article are available for cutting. The method may comprise determining both which one or more portions of the aerosol-generating article have not been cut and have been cut, and which one or more portions are available for cutting.

The method may comprise entering an input into the aerosol-generating device defining a desired aerosol profile; and determining based on the received input, how much of the aerosol-generating article to cut or which portion of the aerosol-generating article to cut. The method may comprise entering an input into the aerosol-generating device defining a desired aerosolization profile; and determining based on the received input a heating profile of the aerosol-generating substrate.

An aerosol-generating system may comprise the aerosol-generating device and an aerosol-generating article receivable by the aerosol-generating device. The aerosol-generating article comprises an aerosol-forming substrate. The aerosol-generating article may comprise a first outer layer and a second outer layer opposite of the first outer layer. One or both of the first outer layer and the second outer layer may comprise a protective layer. The aerosol-generating article comprises an inner layer disposed between the first and second outer layers. The inner layer comprises an aerosol-forming substrate. The inner layer may comprise a nicotine gel. The outer layers may comprise fibrous material. The fibrous material may be derived from cellulose. The first and second outer layers may have planar outer surfaces. The aerosol-generating article may be substantially flat.

The term "puff" is used here to refer to a single inhalation by a user from an aerosol-generating device.

The term "experience" in the context of using the aerosol-generating device to inhale an aerosol is used here to refer to a single usage session that may include multiple puffs.

The term "nicotine" refers to nicotine and nicotine derivatives such as free-base nicotine, nicotine salts and the like.

As used herein, the terms "controller" and "processor" refer to any device or apparatus capable of providing computing capabilities and control capabilities suitable, or configurable to perform the methods, process, and techniques described herein such as, for example, microprocessors, digital signal processors (DSP), application specific integrated circuits (ASIC), field-programmable gate arrays (FPGA), equivalent discrete or integrated logic circuitry, or any combination thereof and of providing suitable data storage capabilities that includes any medium (for example, volatile or non-volatile memory, or magnetic recordable medium such as a disk or tape) containing digital bits (for example, encoded in binary or trinary) that may be readable and writeable.

The term "aerosol" is used here to refer to a suspension of solid particles or liquid droplets, or a combination of solid particles and liquid droplets in a gas. The gas may be air. The solid particles or liquid droplets may comprise one or more volatile flavor compounds. Aerosol may be visible or invisible. Aerosol may include vapors of substances that are ordinarily liquid or solid at room temperature. Aerosol may include vapors of substances that are ordinarily liquid or solid at room temperature, in combination with solid particles or in combination with liquid droplets or in combination with both solid particles and liquid droplets. In some embodiments, the aerosol comprises nicotine.

The term "aerosol-forming substrate" is used here to refer to a material capable of releasing one or more volatile compounds that can form an aerosol. In some embodiments, an aerosol-forming substrate may be heated to volatilize one or more components of the aerosol-forming substrate to form an aerosol. In some cases, volatile compounds may be released by a chemical reaction. In some cases, volatile compounds may be released by a mechanical stimulus, such as ultrasound. Aerosol-forming substrate may be solid or liquid or may comprise both solid and liquid components.

Aerosol-forming substrate may be adsorbed, coated, impregnated or otherwise loaded onto a carrier or support. Aerosol-forming substrate may comprise nicotine. Aerosol-forming substrate may comprise plant-based material. Aerosol-forming substrate may comprise tobacco. Aerosol-forming substrate may comprise a tobacco-containing material containing volatile tobacco flavor compounds, which are released from the aerosol-forming substrate upon heating. Aerosol-forming substrate may alternatively comprise a non-tobacco-containing material. Aerosol-forming substrate may comprise homogenized plant-based material. Aerosol-forming substrate may comprise homogenized tobacco material. Aerosol-forming substrate may comprise at least one aerosol-former. Aerosol-forming substrate may comprise other additives and ingredients, such as flavorants. The aerosol-forming substrate may comprise an active ingredient. The aerosol-forming substrate may be provided as part of an aerosol-generating article. The aerosol-forming substrate may be provided in an aerosol-generating article.

The term "aerosol-generating article" is used here to refer to a disposable product capable of including (for example, holding, containing, having, or storing) aerosol-forming substrate. An aerosol-generating article may be capable of removably interfacing, or docking, with an aerosol-generating device. This allows the aerosol-generating device to generate aerosol from the aerosol-forming substrate of the aerosol-generating article.

The term "aerosol-generating device" is used here to refer to any device configured to be used or utilized with an aerosol forming substrate—that releases volatile compounds to form an aerosol that may be inhaled by a user. The aerosol-generating device may be interfaced with an aerosol-generating article comprising the aerosol-forming substrate.

The term "heating element" is used here to refer to any device, apparatus, or portion thereof configured to provide heat, or heat energy, to an aerosol-generating article to release volatile compounds from the aerosol-generating article to form an aerosol.

The term "gel" refers to a gelled material. The gellified or gelled material may be a solid at room temperature. The gellified or gelled material may substantially maintain its shape and mass at room temperature. Room temperature in this context means 25 degrees Celsius. "Solid" in this context means that the material substantially maintains its shape and mass at room temperature and does not flow.

The terms "integral" and "integrally formed" are used herein to describe elements that are formed in one piece (a single, unitary piece). Integral or integrally formed components may be configured such that they cannot be separably removed from each other without causing structural damage to the piece.

As used herein, the singular forms "a," "an," and "the" also encompass embodiments having plural referents, unless the content clearly dictates otherwise.

As used herein, "or" is generally employed in its sense including "one or the other or both" unless the content clearly dictates otherwise.

The term "about" is used herein in conjunction with numeric values to include normal variations in measurements as expected by persons skilled in the art, and is understood to have the same meaning as "approximately." The term "about" understood to cover a typical margin of error. A typical margin of error may be, for example, ±5% of the stated value.

As used herein, "have," "having," "include," "including," "comprise," "comprising" or the like are used in their open-ended sense, and generally mean "including, but not limited to". It will be understood that "consisting essentially of," "consisting of," and the like are subsumed in "comprising," and the like.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

The term "substantially" as used herein has the same meaning as "significantly," and can be understood to modify the term that follows by at least about 90%, at least about 95%, or at least about 98%. The term "not substantially" as used herein has the same meaning as "not significantly," and can be understood to have the inverse meaning of "substantially," i.e., modifying the term that follows by not more than 10%, not more than 5%, or not more than 2%.

Any direction referred to herein, such as "top," "bottom," "left," "right," "upper," "lower," and other directions or orientations are described for clarity and brevity but are not intended to be limiting of an actual device or system. Devices and systems described herein may be used in a number of directions and orientations.

The present invention relates to aerosol-generating devices, and methods performable thereby, that are configured to use aerosol-generating articles comprising aerosol-forming substrates (for example, comprising nicotine) to generate an inhalable aerosol. The present disclosure relates to aerosol-generating devices that may be used to generate an aerosol from an aerosol-generating article. The devices may include a dosing assembly capable of dosing or metering a portion of the aerosol-generating article. The devices may include a transfer mechanism capable of transferring the portion to a heating element. The heating element may be capable of heating the portion to generate the aerosol. The aerosol-generating article may include nicotine. The present disclosure relates to methods of dosing or metering a portion of an aerosol-generating article in the aerosol-generating device. The aerosol-generating article may be substantially flat. The aerosol-generating article may have a planar shape. The aerosol-generating article may be a sheet. The aerosol-generating article may comprise an aerosol-forming substrate. The aerosol-forming substrate may be a gel that comprises an active ingredient. The active ingredient may be nicotine.

The aerosol-generating devices of the present disclosure may provide various advantages. For example, the aerosol-generating devices may allow a user to conveniently dose an aerosol-forming substrate per puff or per experience. The aerosol-generating devices may allow a user to accurately meter a portion of an aerosol-generating article per puff or per experience. The aerosol-generating devices may allow a user to select the amount of aerosol-forming substrate per puff or per experience. The aerosol-generating devices may allow a user to select the flavor of aerosol-generating article per puff or per experience. The aerosol-generating devices may allow a user to track the amount of aerosol-forming substrate consumed during the experience.

To generate aerosol from the aerosol-generating article, heat is delivered to the dosed portion of the aerosol-generating article, which is described as a "heat-not-burn" process. The heat is generated and delivered to the dosed portion of the aerosol-generating article by a heating element when the dosed portion is received in or transferred to the heating region.

An illustrative aerosol-generating device includes a housing or body that may be configured to hold, or contain, the components of the aerosol-generating device. The housing defines a cavity for receiving an aerosol-generating article. The cavity may be generally defined as any structure configured to mate with an aerosol-generating article. The housing may provide a chamber for the generation of aerosol for deliver to a user. The aerosol-generating device may comprise a heating element. The heating element may be positioned so as to generate aerosol in the chamber.

The housing may further define at least one air inlet and at least one outlet. The inlet and outlet connect the cavity in fluid communication to the exterior of the housing. An airflow path may extend between the at least one inlet and the at least one outlet. The airflow path may pass through the chamber where the aerosol is formed. When aerosol is inhaled by a user of the aerosol-generating device, the air may enter the housing through the at least one inlet, pass through the chamber, and leave the housing through the at least one outlet. The aerosol-generating device comprises a mouthpiece at the outlet-end of the housing.

The cavity may have any suitable shape and size so as to be configurable to receive aerosol-generating articles having different shapes and sizes. The cavity may be a tray or box or may be box-shaped. This may facilitate the cavity in receiving a flat, thin sheet of aerosol-generating article. For instance, the housing may define at least one planar surface. The cavity may be a tube (for example, defining a tubular shape) extending along the cavity axis for receiving tubular, cylindrical, or "stick"-shaped aerosol-generating articles. The tube may form an inner cylindrical surface that faces the aerosol-generating article located therein. The housing may include a closure, such as a lid or a door. For example, a lid or hinged door may form one or more walls of the cavity, enclosing the aerosol-generating article inside the cavity. Further, the lid or door may define an opposing planar surface to the cavity, and thus, the aerosol-generating article may be pinched between a surface of the housing and the surface of the lid or door.

According to an embodiment, the aerosol-generating device includes a dosing assembly positioned to dose or meter one or more portions of the aerosol-generating article. The dosing assembly may define a cutting region. The dosing assembly may be capable of dosing a desired amount or desired portion of the aerosol-generating article for the formation of an aerosol. Advantageously, this may allow a more precise amount of an active ingredient (such as nicotine) to be delivered to a user per puff than when the entire aerosol-generating article is heated at once. In some embodiments, a user may select a desired aerosol profile. The aerosol profile may determine an amount of active ingredient (such as nicotine) deliverable. The aerosol profile may define a flavor profile of aerosol. In some embodiments, a user may select a desired aerosolization profile to be employed. The aerosolization profile may define one or more operational parameters of the aerosol-generating device over a time period. For example, the aerosolization profile may comprise a temperature profile of a target temperature during a usage session of a predefined time or number of puffs. The aerosolization profile may therefore determine an amount of active ingredient (such as nicotine) deliverable. In some embodiments, the aerosol-generating device may select a desired aerosol profile. For example, a controller of the aerosol-generating device may select a desired aerosol profile. This may be, for example, in response to determining a type of aerosol-generating article received by the aerosol-generating device. In some embodiments, the aerosol-generating device may select a desired aerosolization profile to be employed. For example, a controller of the aerosol-generating device may select a desired aerosolization profile. This may be, for example, in response to determining a type of aerosol-generating article received by the aerosol-generating device.

According to an embodiment, the aerosol-generating device includes a transfer mechanism. The transfer mechanism may be configured to transfer the portion of the aerosol-generating article cut by the dosing assembly from the cutting region to the heating element.

In some embodiments, the aerosol-generating article comprises different portions of aerosol-forming substrate that each comprise different flavors. For example, an aerosol-generating article may comprise a first portion of aerosol-forming substrate comprising a first flavorant and a second portion of aerosol-forming substrate comprising a second flavorant. A user may select a desired flavor based on its location on the aerosol-generating article. For example, a user may select a desired flavor on a user interface of the aerosol-generating device. In response, the aerosol-generating device may identify a region of the desired flavor in an aerosol-generating article received by the aerosol-generating device. The cutting mechanism of the dosing assembly may cut a portion of aerosol-forming substrate from the identified region of the aerosol-generating article. The transfer mechanism of the dosing assembly may transfer the cut portion to a heating region of the aerosol-generating device. The transfer mechanism of the dosing assembly may transfer the cut portion to a heating element of the aerosol-generating device.

According to an embodiment, the aerosol-generating device includes a controller. The controller comprises one or more processors (for example, microprocessors). The controller may be operably connected to the dosing assembly. The controller may be operably connected to the cutting mechanism. The controller may be operably connected to the transfer mechanism. The controller may be operably connected to the heating element. The controller may be configured to perform various functions. For example, the controller may be configured to identify at least one property of the aerosol-generating article. The controller may be configured to determine which portion of the aerosol-generating article has not yet been cut. The controller may be configured to determine which portion of the aerosol-generating article has been cut. The controller may be configured to determine which portion of the aerosol-generating article is available for cutting. The controller may be configured to receive an input. The input may be provided from a user. The aerosol-generating device may comprise a user interface with which the user can provide the input. The user interface may comprise one or both of: a touch screen display and one or more actuatable buttons. The input may be provided by one or more sensing means. The controller may be configured to determine which portion of the aerosol-generating article to cut based on the input.

According to an embodiment, a user may insert an aerosol-generating article into the aerosol-generating device. The user may initiate the dosing of the aerosol-generating article by the dosing assembly. For example, the user may turn the device on or actuate the dosing assembly. The user may enter an input into the device to direct the dosing assembly to provide a desired aerosol profile, a desired aerosolization profile, or both aerosol profile and aerosolization profile. For example, the user may input an amount of aerosol, an amount of active ingredient, a flavor, etc. The dosing assembly may determine the appropriate amount or portion of the aerosol-generating article. The dosing assembly may dose (for example, cut) the appropriate amount or portion of the aerosol-generating article. The transfer mechanism may transfer the cut portion to the heating element. The heating element may heat the transferred cut portion to produce the aerosol. The user may inhale the aerosol through the outlet of the aerosol-generating device.

According to an embodiment, the dosing assembly is capable of accurately dosing aerosol-forming substrate. The aerosol-forming material may be dosed per puff or per experience. The dosing assembly may be configured to cut a portion of the aerosol-generating article comprising the aerosol-forming substrate. The portion may be predetermined in size. One dose may be considered to be equivalent to the cut portion of aerosol-generating article. The dose may be consumed by a user in one puff. In other words, one portion may be used to deliver one puff. Alternatively, multiple portions may be used to deliver one puff. Further, the dose may provide multiple puffs and be consumed during one experience. In other words, one portion may be used to deliver multiple puffs.

The dosing assembly may comprise a cutting mechanism. The cutting mechanism may cut a portion of the aerosol-generating article. The cutting mechanism may comprise a blade. The blade may comprise a straight knife or a circular knife, for example a tubular knife. In some embodiments, the cutting mechanism comprises a single or only one blade. In some embodiments, the cutting mechanism comprises at least one or more blades. In some embodiments, the cutting mechanism comprises two or more blades. For example, the cutting mechanism may include a first blade configured to cut in a first direction and a second blade configured to cut in a second direction. The second direction may be different from the first direction.

The blade or multiple blades may be movable. For example, the blade or blades may be movable in a direction perpendicular to the plane of a major surface of the aerosol-generating article. The blade or blades may be movable parallel to the major surface of the aerosol-generating article. For example, the blade or blades may be circular knives that are rotatably movable to cut the aerosol-generating article. The cutting mechanism may include a positioning system. The positioning system may be configured to position the aerosol-generating article for cutting. Alternatively, the aerosol-generating article may be immobilized during cutting. Further, one of the blades may be fixed (immobilized). The positioning system may include any suitable mechanism capable of moving the aerosol-generating article. The positioning system may act as a support for the aerosol-generating article. The positioning system may be configured to push the aerosol-generating article against the cutting edge. In this way, the cutting edge can cut the aerosol-generating article. The positioning system may include one or more screws or springs. Further, the blade or blades may be coupled with any suitable mechanism capable of moving the blade or blades in a predetermined direction and by a predetermined distance. For example, the blade or blades may be moved by a screw system.

The dosing assembly may comprise a motor or other mechanism for providing motion to the cutting mechanism, the positioning system, and the transfer mechanism.

The cutting mechanism may comprise a blade grid. The term "blade grid" is used here to refer to blades arranged in a grid with the cutting edges of the blades pointing in the same direction (for example, downward). The blade grid may be constructed to cut the aerosol-generating article into multiple portions at the same time. The blade grid may be constructed to cut the entire aerosol-generating article into portions at the same time. The blade grid may be constructed to cut the aerosol-generating article to portions that are all the same size or different sizes.

The blade grid may be movable vertically (in a direction normal to the plane of the grid). The blade grid may be movable horizontally (in the plane of the grid). In some embodiments, the blade grid and the cut aerosol-generating article are translatable in a first direction. In some embodiments, the blade grid and the cut aerosol-generating article are translatable in a first direction and a second direction. For example, the blade grid and the cut aerosol-generating article may be moved such that a specific cut portion of the aerosol-generating article may be positioned adjacent (for example, below) a transfer mechanism to be transferred to the heating region.

A user may provide an input to the aerosol-generating device to select an aerosolization profile or an aerosol profile (for example, a desired amount, strength, or flavor). The aerosol-generating device may include an identification system capable of identifying the type of aerosol-generating article. The aerosol-generating device may include an identification system capable of identifying the location of the cut portions of the aerosol-generating device. The aerosol-generating device may include a sensor capable of detecting whether a compartment of the blade grid has a cut portion of the aerosol-generating article present. The controller may determine which cut portion or cut portions to transfer to the heating element to achieve the selected aerosolization profile, aerosol profile, or both. For example, the controller may determine which portion matches the selected flavor, or which portions to combine to match the selected flavor, or how many portions to combine to match the selected amount or strength. The controller may determine what heating profile to employ for the cut portion or cut portions. The heating profile may define, for example, a heating temperature, a heating rate, or a combination of heating temperature and heating rate.

The cutting mechanism may comprise a punch cutter. The punch cutter may cut a single portion at a time. The term "punch cutter" is used here to refer to a cutting mechanism capable of cutting a shape of material from the middle of a sheet of aerosol-generating substrate in one motion. A punch cutter is akin to a cookie cutter in that the blade is configured to cut all of the cut edges of the cut piece at once. The punch cutter may cut a portion from anywhere on the aerosol-generating article. The punch cutter may cut a portion in a desired or selected location on the aerosol-generating article. The punch cutter may include a hollow core surrounded by a blade. The punch cutter may have any suitable shape or size. In some embodiments, the punch cutter is shaped to cut a square or rectangular portion of the aerosol-generating article. The cut may be sized so that the side of the aerosol-generating article is a multiple of the cut size. This way, the entire aerosol-generating article may be utilized without waste. The punch cutter may also act as or include a pushing member constructed to push (for example, move) the cut portion of the aerosol-generating article. The pushing may be effected by compressed gas. The pushing may be effected by a biasing element, such as a spring.

The punch cutter may be movable in a cutting direction perpendicular to a major surface of the aerosol-generating article. The punch cutter may also be movable in one or more directions parallel to the major surface of the aerosol-generating article. This allows positioning of the punch cutter adjacent the desired cutting location on the aerosol-generating article.

In one embodiment, the cut portion cut by the punch cutter is allowed to fall onto the heating element due to gravity. The heating element heats the cut portion. The cut portion may melt into a droplet and then form an aerosol.

In some embodiments the heating element may be fluid permeable. The heating element may comprise a plurality of filaments. The plurality of filaments may form a mesh or array of filaments or may comprise a woven or non-woven fabric. In some embodiments, the plurality of filaments may comprise a susceptor material. In some embodiments, the plurality of filaments may be a plurality of electrically conductive filaments. The plurality of electrically conductive filaments may be connected to first and second electrically conductive contact portions wherein the first and second electrically conductive contact portions are configured to allow contact with an external power supply. The first and second electrically conductive contact portions may be positioned on opposite sides to one another. In some embodiments, the heating element may comprise one or more openings. Advantageously, a fluid permeable heating element may act as a capillary transport vehicle for melted or volatilized aerosol-forming substrate. Advantageously, a fluid permeable heating element, particularly a mesh heating element may act as a capillary transport vehicle for melted or volatilized aerosol-forming substrate. For example, when a cut portion of the aerosol-forming substrate is applied to (for example, falls onto) the heating element, the heating element may heat the cut portion, melting it into a droplet. The droplet may be transported by capillary action of the mesh heating element. For example, the droplet may be draw toward an airflow channel of the aerosol-generating device. Air in the airflow channel may become entrained with droplets to form an aerosol.

In one embodiment, the cutting mechanism comprises a punch cutter, and the punch cutter comprises the heating element configured to heat the cut portion of the aerosol-generating article. The punch cutter may be constructed to retain the cut piece. The cut portion of the aerosol-generating article may remain inside the punch cutter to be heated. The hollow center of the punch cutter may be connected to the airflow path of the aerosol-generating device. For example, the hollow center may be surrounded by walls that include an inlet and an outlet. The hollow center may be surrounded by thermal insulation on one or more sides.

In some embodiments, the cutting mechanism may engage the aerosol-generating article in vertical direction. That is, the cutting mechanism may engage the aerosol-generating article in a direction perpendicular to the plane of a major surface of the aerosol-generating article. In some embodiments, the cutting mechanism (for example the blade) may engage the aerosol-generating article in a non-perpendicular direction to the plane of a major surface of the aerosol-generating article. For example, a blade may engage the aerosol-generating article in a parallel direction relative to the plane of a major surface of the aerosol-generating article.

The dosing assembly may comprise a support member against which the cutting mechanism cuts the aerosol-generating article.

According to an embodiment, the dosing assembly comprises a transfer mechanism for transferring the portion of the aerosol-generating article to the heating element. The transfer mechanism may comprise a pushing member. The pushing member may be constructed to push (for example, move) the cut portion of the aerosol-generating article. The pushing member may be constructed to push one or more cut portions of the aerosol-generating article cut with a blade grid. The pushing member may be constructed to push one or more portions cut by a blade. The pushing member may be oriented to push cut portion along the plane of the major surfaces of the aerosol-generating article. The pushing member may be oriented to push the cut portion perpendicular to the plane of a major surface of the aerosol-generating article. In some embodiments, the transfer mechanism comprises a gravity-fed path that allows the portion to fall onto or into the heating element.

The dosing assembly may comprise a system capable of identifying and localizing compartments of grid or portions of aerosol-generating article. For example, the dosing assembly may comprise a controller comprising one or more processors. The controller may be configured to control the dosing assembly to move the aerosol-generating article or the cutting mechanism or both. The controller may be configured to control the transfer mechanism to move the pushing member.

The controller may be capable of receiving an input. For example, the controller may be capable of receiving an input from a user. Possible inputs include a keyed connection, a reader such as a "RFID" (radio-frequency identification) reader, a sensor, and the like. The input receiver may allow a user to select a desired aerosol profile, aerosolization profile, or both. A desired aerosol profile or aerosolization profile may include amount of aerosol, number of puffs, amount (for example, concentration or total amount) of active ingredient, flavor, etc. The input receiver may allow a user to select an amount, such as an amount of aerosol, number of puffs, or an amount (for example, concentration or total amount) of active ingredient. The input receiver may allow a user to select a specific portion or portions of the aerosol-generating article, which may have different content (for example flavor or active ingredient) than other parts.

The controller may be configured to determine which portion or portions of the aerosol-generating article to cut. For example, the controller may be configured to determine which one or more portions of the aerosol-generating article have not yet been cut. The controller may be configured to determine which one or more portions of the aerosol-generating article have been cut. The controller may be configured to determine which one or more portions of the aerosol-generating article are available for cutting. The controller may be configured to determine which portion to cut based on the input received. The controller may be configured to determine how much of the aerosol-generating article to cut based on the input received.

The controller may comprise a sensor for sensing the presence of the aerosol-generating article or a portion of the aerosol-generating article. For example, the controller may comprise an IR sensor.

The aerosol-generating device may include a controller comprising one or more processors (for example, microprocessors). The one or more processors may operate with associated data storage, or memory, for access to processing programs or routines and one or more types of data that may be employed to carry out the illustrative methods. For example, processing programs or routines stored in data storage may include programs or routines for controlling the one or more of the dosing assembly, transfer mechanism, and heating element, individually controlling each of the one or more of the dosing assembly, transfer mechanism, and heating element, implementing programs or schemes using the one or more of the dosing assembly, transfer mechanism, and heating element, analyzing or identifying aerosol-generating articles, recalling one or more properties of identified aerosol-generating articles, recalling one or more programs associated with one or more properties of identified aerosol-generating articles, controlling movement of blades, positioning system, transfer mechanism, and the heating of the heating element, standardization algorithms, comparison algorithms, or any other processing used to implement the one or more illustrative methods and processes described herein. The data storage, or memory, may be further configured to store data related to one or more types, sizes, shapes, content, age, brand, and density of aerosol-generating articles, one or more other properties of aerosol-generating articles, one or more processes or schemes for using the one or more of the dosing assembly, transfer mechanism, and heating element to heating various aerosol-generating articles, aerosolization production or generation parameters related to the one or more types of aerosol-producing articles and materials such as power values and time values, data and formulas related to the generation of particulate matter using the aerosol-generating articles or materials, and any other data or formulas necessary to perform the processes and methods described herein.

In one or more embodiments, the aerosol-generating device may be described as being implemented using one or more computer programs executed on one or more programmable processors that include processing capabilities (for example, microcontrollers or programmable logic devices), data storage (for example, volatile or non-volatile memory or storage elements), input devices, and output devices. Program code, or logic, described herein may be applied to input data to perform functionality described herein and generate desired output information. The output information may be applied as input to one or more other devices or processes as described herein or as would be applied in a known fashion.

The computer program products used to implement the processes described herein may be provided using any programmable language, for example, a high-level procedural or object orientated programming language that is suitable for communicating with a computer system. Any such program products may, for example, be stored on any suitable device, for example, a storage media, readable by a general or special purpose program, controller apparatus for configuring and operating the computer when the suitable device is read for performing the procedures described herein. In other words, at least in one embodiment, the aerosol-generating device may be implemented using a non-transitory computer readable storage medium, configured with a computer program, where the storage medium so configured causes the computer to operate in a specific and predefined manner to perform functions described herein.

The exact configuration of the controller of the aerosol-generating device is not limiting and essentially any device capable of providing suitable computing capabilities and control capabilities to implement the method may be used. In view of the above, it will be readily apparent that the functionality may be implemented in any manner as would be known to one skilled in the art. As such, the computer language, the controller, or any other software/hardware which is to be used to implement the processes described herein shall not be limiting on the scope of the systems, processes, or programs (for example, the functionality provided by such processes or programs) described herein. The methods and processes described in this disclosure, including those attributed to the systems, or various constituent components, may be implemented, at least in part, in hardware, software, firmware, or any combination thereof. For example, various embodiments of the techniques may be implemented within one or more processors, including one or more microprocessors, DSPs, ASICs, FPGAs, CPLDs, microcontrollers, or any other equivalent integrated or discrete logic circuitry, as well as any combinations of such components. When implemented in software, the functionality ascribed to the systems, devices, and methods described in this disclosure may be embodied as instructions on a computer-readable medium such as RAM, ROM, NVRAM, EEPROM, FLASH memory, magnetic data storage media, optical data storage media, or the like. The instructions may be executed by one or more processors to support one or more embodiments of the functionality.

The controller of the aerosol-generating device may be operatively coupled to the power source and the one or both of the dosing assembly (for example, cutting mechanism, positioning system, and transfer mechanism) and heating element so as to control the functioning of the one or both of the dosing assembly (for example, cutting mechanism, positioning system, and transfer mechanism) and heating element. Thus, the controller may use electrical circuitry and the power source to independently energize ("turn on") or not energize ("turn off") each of the one or both of the dosing assembly (for example, cutting mechanism, positioning system, and transfer mechanism) and heating element.

In one embodiment, the controller may be described as being operably coupled to one or both of the dosing assembly (for example, cutting mechanism, positioning system, and transfer mechanism) and heating element to do one or more of the following: identify an aerosol-generating article; receive an input from a user; determine which portions of the aerosol-generating article have not been cut or used; determine which portions of the aerosol-generating article have been cut or used; determine which portion of the aerosol-generating article to cut; to position the aerosol-generating article; to cut a portion of the aerosol-generating article; to transfer the cut portion; or to heat the cut portion. In other words, each of the dosing assembly (for example, cutting mechanism, positioning system, and transfer mechanism) and heating element may be addressable by the controller.

According to an embodiment, the aerosol-generating device is configured to receive an aerosol-generating article. The aerosol-generating article may be any suitable type, shape, or size. In some embodiments, the aerosol-generating article is in the shape of a flat sheet. The flat sheet may comprise two opposing major surfaces. The flat sheet may comprise multiple layers. The aerosol-generating article may comprise a gel, solid, or semisolid material. The gel, solid, or semisolid material may comprise an aerosol-forming substrate. The gel, solid, or semisolid material may comprise a tobacco-based material. The gel, solid, or semisolid material may comprise an active ingredient. The active ingredient may be nicotine. The gel, solid, or semisolid material may form a center layer sandwiched between outer layers.

The outer layers may be protective layers configured to allow a user to handle the aerosol-generating article without coming into contact with the center layer. The outer layers may be constructed to shield or protect the layer containing the active ingredient. The outer layers may include any suitable material. In one embodiment, the outer layers comprise a fibrous material. The outer layers may have a composition that does not interfere with the active ingredient during storage, handling, or use (for example, heating). The outer layers may be permeable to gases. The outer layers may be impermeable to liquids.

The aerosol-generating article is capable of being portioned by cutting into pieces. The aerosol-generating article may be a flat sheet. Advantageously, a flat sheet can be easily cut into a grid. The flat sheet may comprise multiple layers. The aerosol-generating article may have a predetermined thickness. Preferably, the predetermined thickness is even throughout the aerosol-generating article. An even thickness of the aerosol-generating article allows the active ingredient to be dosed accurately by the dosing assembly. In some embodiments, the thickness of the aerosol-generating article varies less than 25%, less than 20%, less than 10%, or less than 5% throughout the aerosol-generating article. In some embodiments, the aerosol-generating article has a different shape, such as tubular, cylindrical, or "stick"-shaped.

Some parts of the aerosol-generating article may have a different composition than other parts. For example, some parts of the aerosol-generating article may have a different flavor than other parts. Some parts of the aerosol-generating article may have a different active ingredient or a different concentration of active ingredient than other parts.

In some embodiments, the aerosol-generating article comprises a gel. For example, the aerosol-generating substrate of the aerosol-generating article may be in the form of a gel. Advantageously the gel is solid at room temperature and may be easily handled by a user. The aerosol-generating article may comprise one or more outer layers. The one or more outer layers may be protective outer layers. Advantageously, providing outer layers may facilitate handling of the article by a user. The aerosol-generating article may comprise a gel (for example, a sheet of gel) sandwiched between two protective outer layers, one of the protective outer layers being disposed on each side of a sheet of gel.

In some embodiments, the aerosol-generating substrate comprises nicotine. Nicotine may be included in the aerosol-generating substrate in free base form or in salt form. The aerosol-generating substrate may comprise nicotine at a concentration of 1 wt-% or greater, 1.5 wt-% or greater, or 2 wt-% or greater. The aerosol-generating substrate may comprise nicotine at a concentration of 4 wt-% or less, 3 wt-% or less, or 2.5 wt-% or less. In one embodiment, the aerosol-generating substrate comprises about 2 wt-% nicotine.

In some embodiments, the aerosol-generating substrate comprises a gel that comprises an active ingredient and one or more gelling agents. The active ingredient may comprise nicotine. Nicotine may be included in the gel in a free base form or in salt form. The gel may comprise nicotine at a concentration of 1 wt-% or greater, 1.5 wt-% or greater, or 2 wt-% or greater. The gel may comprise nicotine at a concentration of 4 wt-% or less, 3 wt-% or less, or 2.5 wt-% or less. In one embodiment, the gel comprises about 2 wt-% nicotine. The one or more gelling agents may comprise a biopolymer. Examples of suitable biopolymers include polysaccharides, such as gellan gums (native, low acyl gellan gums and high acyl gellan gums), xanthan gum, alginates (alginic acid), agar (a mixture of agarose and agaropectin), agarose, guar gum, and the like. The gel may comprise gelling agent at a concentration of 1 wt-% or greater, 1.5 wt-% or greater, or 2 wt-% or greater. The gel may comprise gelling agent at a concentration of 7 wt-% or less, 5 wt-% or less, or 3 wt-% or less.

The aerosol-generating substrate may comprise additional ingredients, such as flavorants, aerosol formers, water, compounds that assist gelling, and the like. In one embodiment, the aerosol-generating substrate comprises one or more flavorants. The one or more flavorants may comprise tobacco flavors. Examples of suitable tobacco flavors include synthetic and naturally derived tobacco components. Naturally derived tobacco components may include volatile flavors or flavor compounds obtained from tobacco plant material. Such components may be obtained by any suitable method, such as extraction, drying, milling, etc. Synthetic tobacco components may comprise flavor molecules found in tobacco leaves, such as beta-damascenone, alpha- and 3-oxo-alpha-ionone, beta- and 4-oxo-beta-ionone, theaspirone, 2-ethyl-3,5-dimethylpyrazine, phenylacetaldehyde, guaiacol, and furaneol. Other suitable flavorants include, for example, natural or synthetic menthol, peppermint, spearmint, coffee, tea, spices (such as cinnamon, clove, ginger, or combination thereof), cocoa, vanilla, fruit flavors, chocolate, eucalyptus, geranium, eugenol, agave, juniper, anethole, linalool, and any combination thereof.

In one embodiment, the aerosol-generating substrate (for example, gel) comprises glycerol. For example, the aerosol-generating substrate may comprise glycerol at a concentration of 50 wt-% or greater, 60 wt-% or greater, or 70 wt-% or greater. The aerosol-generating substrate may comprise glycerol at a concentration of 95 wt-% or less, 90 wt-% or less, or 80 wt-% or less. In one embodiment, the aerosol-generating substrate comprises water. For example, the aerosol-generating substrate may comprise water at a concentration of 10 wt-% or greater, 15 wt-% or greater, or 20 wt-% or greater. The aerosol-generating substrate may comprise water at a concentration of 25 wt-% or less, 20 wt-% or less, or 15 wt-% or less. In some embodiments, the aerosol-generating substrate is free or substantially free of water.

In some embodiments the aerosol-generating substrate comprises a gel comprising one or more divalent cations. Examples of suitable divalent cations include compounds that comprise calcium, such as calcium lactate in solution. The divalent cation may be present in the gel at a concentration of 0.1 wt-% or greater, or 0.5 wt-% or greater. The divalent cation may be present in the gel at a concentration of 1 wt-% or less. In some embodiments the gel comprises one or more carboxylic acids. The carboxylic acid may comprise a ketone group. The carboxylic acid may have 10 carbon atoms or less. Preferably, the carboxylic acid has 5 carbon atoms. Preferably, the carboxylic acid is levulinic acid.

One example of a suitable aerosol-generating substrate is a gel comprising nicotine and one or more gelling agents. The gel may comprise from 1 wt-% to 4 wt-% nicotine. The gel may comprise from 1 wt-% to 7 wt-% gelling agent. The gel may comprise from 50 wt-% to 70 wt-% glycerol. The gel may comprise a flavorant, such as a tobacco-based extract. The gel composition may comprise a gelling agent forming a solid medium, glycerol dispersed in the solid medium, and nicotine dispersed in the glycerol.

The aerosol-generating substrate (for example, gel) may be cut into portions with the cutting mechanism of the dosing assembly. The cut portion of the gel may be transferred to the heating element by the transfer mechanism. When the gel is heated by the heating element, the glycerol and the nicotine form an aerosol that may be inhaled by a user. In some embodiments, the heating element comprises a mesh heating element. The cut portion of the gel may be applied to (for example, falls onto) the mesh heating element, causing the gel to melt into a droplet. The droplet may be transported by capillary action of the mesh heating element. For example, the droplet may be draw toward an airflow channel of the aerosol-generating device. Air in the airflow channel may become entrained with droplets to form an aerosol.

The aerosol-generating device may be constructed to result in a desired resistance to draw (RTD). The RTD of the aerosol-generating device will vary depending on, among other things, the length and dimensions of the passageways, the size of the apertures, the dimensions of the most constricted cross-sectional area of the internal passageway, and the materials used. In specific embodiments the RTD of the aerosol-generating device is between 50 millimeter of water (mm $H_2O$) and 140 millimeter of water (mm $H_2O$), between 60 millimeter of water (mm $H_2O$) and 120 millimeter of water (mm $H_2O$), or between 80 millimeter of water (mm $H_2O$) and 100 millimeter of water (mm $H_2O$). The RTD of the article refers to the static pressure difference between the one or more apertures and the mouth end of the article when it is traversed by an inner longitudinal passageway under steady conditions in which the volumetric flow is 17.5 milliliters per second at the mouth end. The RTD of a specimen can be measured using the method set out in ISO Standard 6565:2002.

In specific embodiments the aerosol-generating device comprises plastic material; a metal material; a cellulosic material, such as cellulose acetate; paper; cardboard; cotton; or combinations thereof.

The aerosol-generating device preferably comprises control electronics operably coupled to the heating element. The control electronics may be configured to control heating of the heating element. The control electronics may form a part of the controller or may include additional parts. The control electronics may include, for example, a thermostat or thermocouple.

Reference will now be made to the drawings, which depict one or more embodiments described in this disclosure. However, it will be understood that other embodiments not depicted in the drawings fall within the scope and of this disclosure. Like numbers used in the figures refer to like components, steps and the like. However, it will be understood that the use of a number to refer to a component in a given figure is not intended to limit the component in another figure labeled with the same number. In addition, the use of different numbers to refer to components in different figures is not intended to indicate that the different numbered components cannot be the same or similar to other numbered components. The figures are presented for purposes of illustration and not limitation. Schematic drawings presented in the figures are not necessarily to scale.

Figure 1:
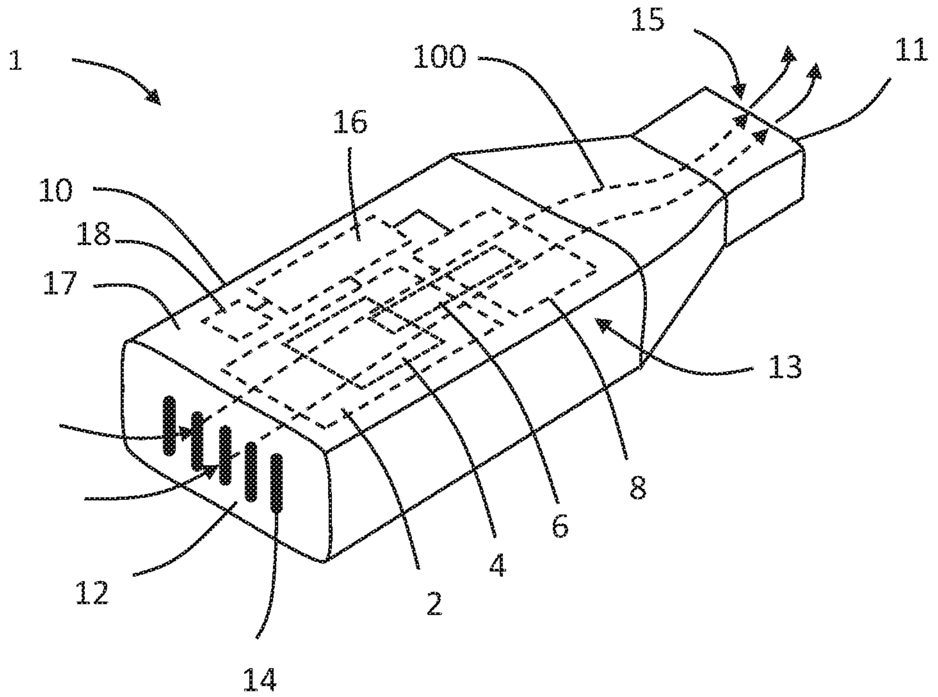
FIG. 1 is a perspective view of an illustrative aerosol-generating device according to an embodiment.

An illustrative aerosol-generating device 1 is shown in FIG. 1. The aerosol-generating device 1 may include a housing 10. Although a particular shape of the housing is shown, many other shapes are possible. The aerosol-generating device 1 is not particularly limited by the shape of the housing. In this illustrative embodiment of FIG. 1, the housing 10 extends form a first end 11 to a second end 12. The first end 11 may be a mouthpiece end. The housing 10 may include, or define, a cavity 13 for receiving an aerosol-generating article 20. The cavity 13 may be sized and shaped accordingly. For example, the cavity 13 of device 1 of FIG. 1 defines a rectangular, or box-like, area for receiving a substantially thin, rectangular aerosol-generating article 20.

The housing 10 may comprise one or more inlets 14 that extend from outside of the cavity 13 to inside of the cavity for the ingress of air. The housing 10 may comprise one or more outlets 15 that extend from inside of the cavity 13 to outside of the cavity for discharge of air. An air flow path extends from the inlet 14 to the outlet 15, passing through at least a portion of the cavity 13. In this way, a user may inhale from the first end 11 of the aerosol-generating device 10 to draw airflow form the one or more inlets 14 through the cavity 13, and out the outlets 15 to deliver aerosol to the user. For example, the airflow path is designated by the arrows 100 shown in FIG. 1.

The housing 10 of the aerosol-generating device 1 may further include a door 17 for inserting the aerosol-generating article in the cavity 13. The door 17 may form a wall of the cavity 13.

The aerosol-generating device 1 housing 10 may house the parts of the aerosol-generating device. For example, the housing 10 may house the dosing assembly 2, the heating element 8, and the controller 16. The dosing assembly 2 may include a cutting mechanism 4 and a transfer mechanism 6. The cutting mechanism 4 may define a cutting region. The heating element 8 may define a heating region. The transfer mechanism 6 may be configured to transfer a cut portion from the cutting region to the heating region to be heated by the heating element 8. The controller 16 may be operatively connected to the dosing assembly 2 and the heating element 8. The aerosol-generating device 1 may further comprise a power supply 18, such as a battery.

Figure 2:
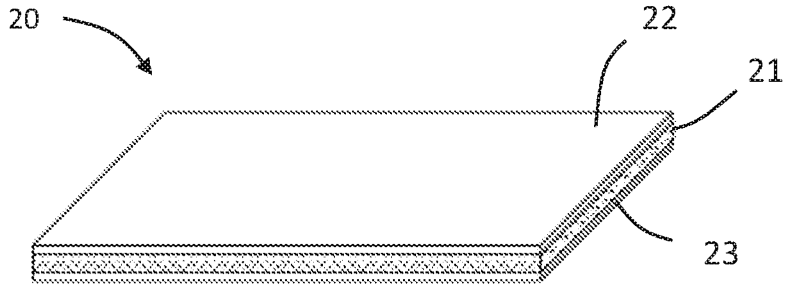
FIG. 2 is a perspective view of an illustrative aerosol-generating article for use in the aerosol-generating device of FIG. 1 according to an embodiment.

An exemplary embodiment of an aerosol-generating article 20 is shown in FIG. 2. The aerosol-generating article 20 may be any suitable type, shape, or size. In the embodiment shown, the aerosol-generating article 20 is in the shape of a flat sheet. The flat sheet may comprise outer layers 22, 23 defining two opposing major surfaces. The aerosol-generating article 20 may comprise an aerosol-forming substrate 21. The aerosol-forming substrate 21 may be a layer of gel, solid, or semisolid material. The gel, solid, or semisolid material may comprise a tobacco-based material. The gel, solid, or semisolid material may comprise an active ingredient. The active ingredient may be nicotine. The aerosol-forming substrate 21 may form a center layer sandwiched between the outer layers 22, 23.

Figure 3:
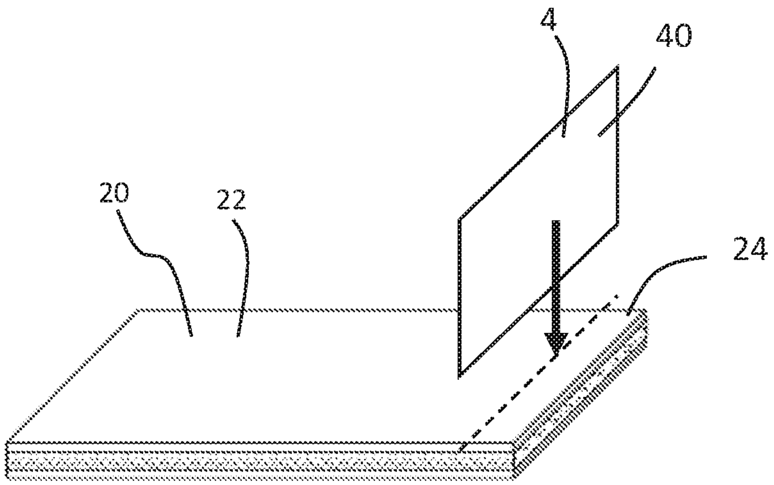
FIG. 3 is a schematic perspective view of an illustrative blade for cutting the aerosol-generating article of FIG. 2 according to an embodiment.

The dosing assembly 2 may comprise a cutting mechanism 4 disposed in a cutting region and configured to cut a portion from an aerosol-generating article received by the aerosol-generating device. Referring now to FIG. 3, the cutting mechanism 4 may comprise a blade 40. The blade 40 may be configured to engage the aerosol-generating article 20 in a direction perpendicular to the plane of the major surface (outer layer) 22. Alternatively, the blade 40 may be configured to engage the aerosol-generating article in a direction parallel to the plane of the major surface (outer layer) 22. According to an embodiment, the blade 40 is configured to cut a portion 24 of the aerosol-generating article.

Figure 4:
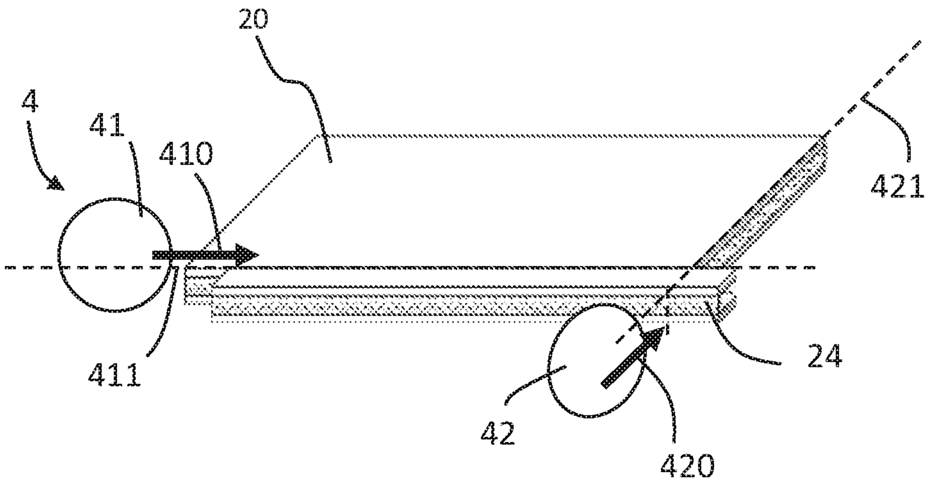
FIG. 4 is a schematic perspective view of illustrative first and second blades for cutting the aerosol-generating article of FIG. 2 according to an embodiment.

The cutting mechanism 4 may comprise more than one blade. In the embodiment shown in FIG. 4, the cutting mechanism 4 comprises a first blade 41 and a second blade 42. The first blade 41 is movable in a first cutting direction 410 and the second blade 42 is movable in a second cutting direction 420. The blades may be movable along cut lines 411, 421 shown as dashed lines in FIG. 4. The portion 24 of the aerosol-generating article 20 may be cut by cutting larger portion along the first cut line 411, and then cutting the portion 24 from the larger portion along the second cut line 421.

Figure 5A:
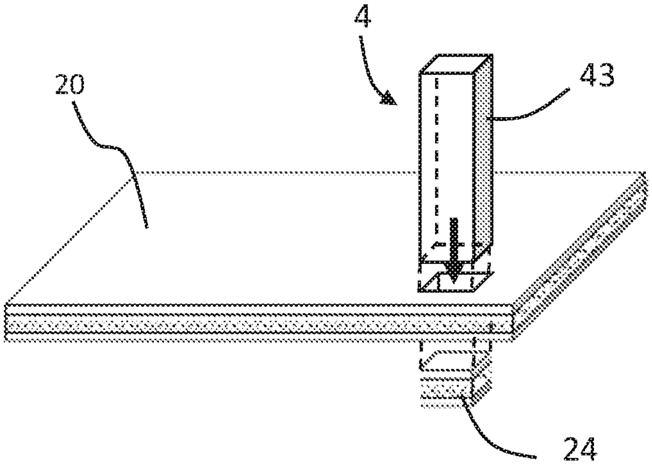
FIG. 5A is a schematic perspective view of an illustrative punch cutter for cutting the aerosol-generating article of FIG. 2 according to an embodiment.
Figure 5B:
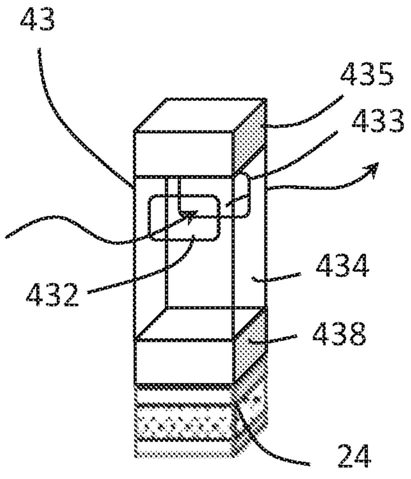
FIG. 5B is a sectional view of the punch cutter of FIG. 5A according to an embodiment.

The cutting mechanism 4 may comprise a punch cutter 43, as shown in FIGS. 5A and 5B. The punch cutter 43 may comprise a hollow tube that may be pushed against the aerosol-generating article 20 to cut out a portion 24 of the aerosol-generating article 20.

In some embodiments, for example as shown in FIG. 5B, the punch cutter 43 may be configured to retain the cut portion 24 inside the body of the punch cutter 43. The punch cutter 43 may comprise a heating element 438 configured to heat the cut portion 24 of the aerosol-generating article 20. The heating element 438 may be porous to allow passage of the aerosol through the heating element 438. The body of the punch cutter 43 may have a hollow center 434 that may collect the aerosol formed by heating of the cut portion 24. The hollow center 434 may comprises an inlet 432 and outlet 433, connecting the hollow center 434 to the airflow path of the aerosol-generating device 1. The punch cutter 43 may comprise thermal insulation 435. The thermal insulation 435 may surround the hollow center 434 on one or more sides.

Figure 6A:
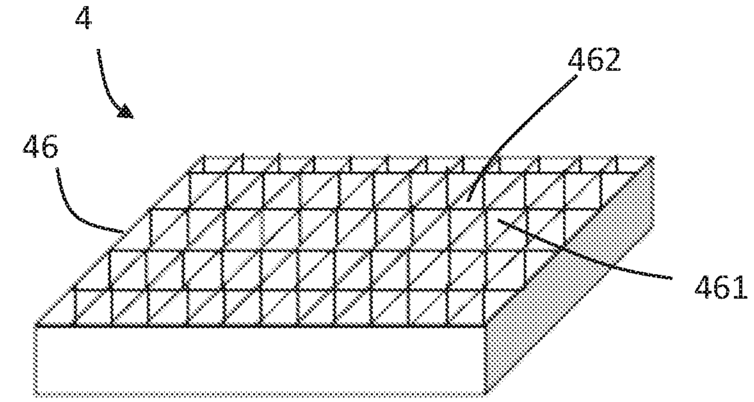
FIG. 6A is a schematic perspective view of an illustrative blade grid for cutting the aerosol-generating article of FIG. 2 according to an embodiment.
Figure 6B:
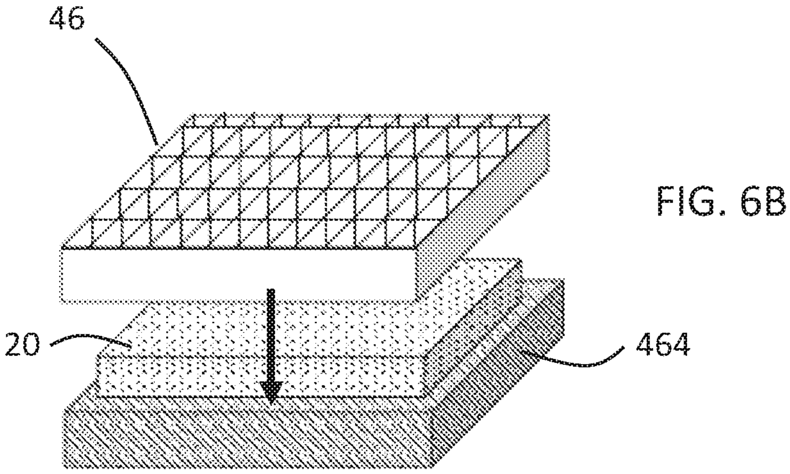
FIG. 6B is a schematic perspective view of the blade grid of FIG. 6A for cutting the aerosol-generating article of FIG. 2 according to an embodiment.

The cutting mechanism 4 may comprise a blade grid 46, as shown in FIGS. 6A and 6B. The blade grid 46 may comprise a plurality of blades 461, 462 that form a grid. The blade grid 46 may be able to cut the aerosol-generating article 20 into multiple cut portions at once. The blade grid 46 may be able to cut the entire aerosol-generating article 20 into cut portions at once. The cutting mechanism 4 may cut the aerosol-generating article 20 against a support surface 464, as shown in FIG. 6B.

Figure 7:
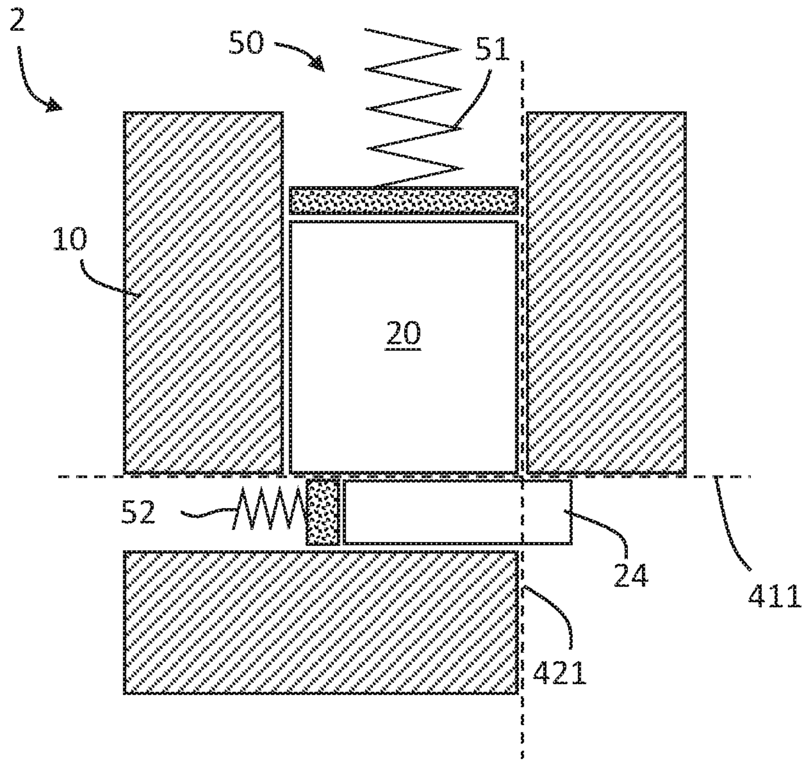
FIG. 7 is a schematic perspective view of a positioning system for positioning the aerosol-generating article of FIG. 2 for cutting according to an embodiment.

Referring now to FIG. 7, the dosing assembly 2 may include a positioning system 50 for positioning the aerosol-generating article 20 or a portion of the aerosol-generating article 20 for cutting. The positioning system 50 may comprise one or more biasing members 51, 52. For example, the positioning system 50 may comprise a first biasing member 51 configured to push the aerosol-generating article 20 in a first direction. Pushing the aerosol-generating article 20 in the first direction may cause the aerosol-generating article 20 to be pushed to a position where the aerosol-generating article 20 intersects with the cut line 411 of at least one blade. The positioning system 50 may comprise a second biasing member 52 configured to push the aerosol-generating article 20 or a portion of the aerosol-generating article 20 in a second direction. The second direction may be different from the first direction. In some embodiments, the second direction is perpendicular to the first direction. Pushing the aerosol-generating article 20 or a portion of the aerosol-generating article 20 in the second direction may cause the aerosol-generating article 20 or a portion of the aerosol-generating article 20 to be pushed to a position where the aerosol-generating article 20 or a portion of the aerosol-generating article 20 intersects with the cut line 421 of at least one blade (for example, a second blade). The biasing members 51, 52 may include a pushing member and may be actuated by any suitable mechanism, such as by screws, pins, springs, compressed gas, etc.

Figure 8:
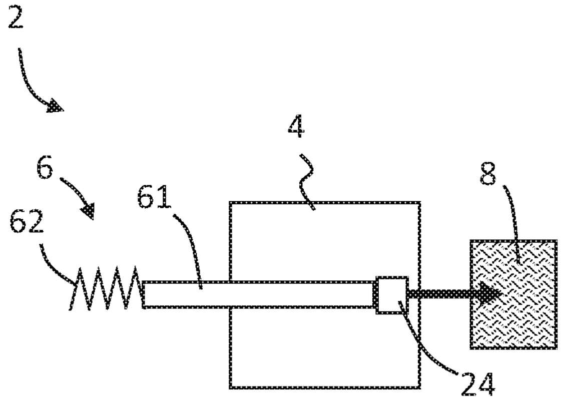
FIG. 8 is a schematic perspective view of a transfer mechanism for transferring the cut portion of the aerosol-generating article of FIG. 2 according to an embodiment.

Referring now to FIG. 8, the dosing assembly 2 may include a transfer mechanism 6. The transfer mechanism 6 may include one or more pushing members 61. The one or more pushing members may be linearly translatable in a first direction and optionally in a second direction and optionally in a third direction. The pushing member 61 may be translated by, for example, a biasing member 62 or a screw. The pushing member 61 may be configured to engage the cut portion 24 of the aerosol-generating article 20 and transfer (for example, push) it from the cutting region to adjacent the heating element 8. The pushing member 61 may translate the cut portion 24 in a first direction and a second direction. The pushing member 61 may translate the cut portion 24 in a third direction.

Figure 9:
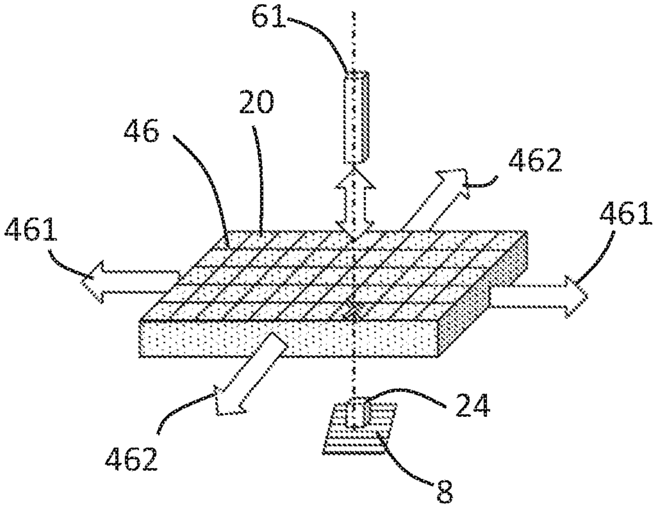
FIG. 9 is a schematic perspective view of the blade grid and cut aerosol-generating article of FIG. 6B and the transfer mechanism of FIG. 8 according to an embodiment.

The transfer mechanism 6 may be combined with any of the cutting mechanisms discussed above. In one example, the transfer mechanism 6 may be combined with a blade grid 46, as shown in FIG. 9. After the aerosol-generating article 20 has been cut by the blade grid 46, a pushing member 61 of the transfer mechanism 6 may be used to push one or more cut portions 24 of the aerosol-generating article 20 onto the heating element 8. The heating element 8 may be any suitable type of heating element, such as a mesh heating element. The blade grid 46 and cut aerosol-generating article 20 may be translatable in a first direction 461 and a second direction 462. The blade grid 46 and cut aerosol-generating article 20 may be moved to position a specific cut portion 24 adjacent a transfer member 61 such that the transfer member 61 may engage the intended cut portion 24. This process may be repeated for one or more additional cut portions 24 to either combine cut portions 24 to create a desired flavor profile. For example, cut portions may be combined to increase the amount of aerosol-forming substrate, or to create a desired flavor mixture.

Thus, illustrative devices and methods using a dosing assembly are described. Various modifications and variations of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in the electrical arts, computer arts and aerosol-generating device manufacturing or related fields are intended to be within the scope of the following claims.

The invention claimed is:

1. An aerosol-generating device comprising
- a heating element;
- a dosing assembly comprising:
  - a cutting mechanism disposed in a cutting region and configured to cut a portion from an aerosol-generating article received by the aerosol-generating device, the cutting mechanism comprising:
    - a punch cutter comprising a hollow core surrounded by a blade; or a first blade with a first cutting direction and a second blade with a second cutting direction; or a blade grid; and a transfer mechanism configured to transfer a cut portion of the aerosol-generating article from the cutting region to the heating element.

2. The aerosol-generating device of claim 1, wherein the cutting mechanism comprises a first blade having a first cutting direction and a second blade having a second cutting direction, wherein the second cutting direction is different from the first cutting direction, optionally wherein the second cutting direction is perpendicular to the first cutting direction.

3. The aerosol-generating device of claim 2, wherein the first blade is movable in the first cutting direction and the second blade is movable in the second cutting direction.

4. The aerosol-generating device of claim 1, wherein the cutting mechanism comprises a blade grid constructed to simultaneously cut the consumable into multiple portions.

5. The aerosol-generating device of claim 1, wherein the cutting mechanism comprises a punch cutter.

6. The aerosol-generating device of claim 1, wherein the transfer mechanism comprises a pushing member that is linearly translatable in a first direction and optionally in a second direction and optionally in a third direction.

7. The aerosol-generating device of claim 1, wherein the dosing assembly comprises a controller comprising one or more processors, the controller configured to:

determine which one or more portions of the aerosol-generating article have not been cut or have been cut; or determine which one or more portions of the aerosol-generating article are available for cutting; or both.

8. The aerosol-generating device of claim 1, wherein the dosing assembly comprises a controller comprising one or more processors, the controller configured to:

receive an input defining a desired aerosol profile, aerosolization profile or both aerosol profile and aerosolization profile; and determine based on the received input, one or more of:

how much of the aerosol-generating article to cut;

which portion of the aerosol-generating article to cut.

9. A method of dosing an aerosol-generating article using the aerosol-generating device of claim 1, the method comprising:

placing the aerosol-generating article in the cutting region;

actuating the cutting assembly to cut a portion of the aerosol-generating article;

actuating the transfer mechanism to transfer the portion into a heating region of the aerosol-generating device; and heating the portion with the heating element.

10. The method of claim 9, further comprising determining which one or more portions of the aerosol-generating article have not been cut or have been cut, or which one or more portions of the aerosol-generating article are available for cutting, or both.

11. The method of claim 9, further comprising:

entering an input into the aerosol-generating device defining a desired aerosol profile, aerosolization profile or both aerosol profile and aerosolization profile; and determining based on the received input, how much of the aerosol-generating article to cut or which portion of the aerosol-generating article to cut.

12. An aerosol-generating system comprising:

the aerosol-generating device of claim 1, and an aerosol-generating article receivable by the aerosol-generating device, the aerosol-generating article comprising:

a first outer layer and a second outer layer opposite of the first outer layer; and an inner layer disposed between the first and second outer layers, the inner layer comprising an aerosol-forming substrate.

13. The aerosol-generating system of claim 12, wherein the inner layer comprises a gel, the gel optionally comprising nicotine.

14. The aerosol-generating system of claim 12, wherein the inner layer and the outer layers comprise fibrous material, and optionally wherein the fibrous material is derived from cellulose.

15. The aerosol-generating system of claim 12, wherein the first and second outer layers have planar outer surfaces.

* * * * *